United States Patent
Sreenivasan et al.

(10) Patent No.: US 8,769,132 B2
(45) Date of Patent: Jul. 1, 2014

(54) FLEXIBLE FAILOVER POLICIES IN HIGH AVAILABILITY COMPUTING SYSTEMS

(75) Inventors: Padmanabhan Sreenivasan, Burnaby (CA); Ajit Dandapani, Los Altos, CA (US); Michael Nishimoto, San Jose, CA (US); Ira Pramanick, San Jose, CA (US); Manish Verma, Sunnyvale, CA (US); Robert D. Bradshaw, Jr., San Jose, CA (US); Luca Castellano, Los Gatos, CA (US); Raghu Mallena, San Jose, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 0 days.

(21) Appl. No.: 12/891,390

(22) Filed: Sep. 27, 2010

(65) Prior Publication Data

US 2011/0214007 A1 Sep. 1, 2011

Related U.S. Application Data (63) Continuation of application No. 09/997,404, filed on Nov. 29, 2001, now abandoned, which is a continuation of application No. 09/811,357, filed on Mar. 16, 2001, now abandoned.

(60) Provisional application No. 60/189,864, filed on Mar. 16, 2000.

(51) Int. Cl.
*G06F 11/20* (2006.01)

(52) U.S. Cl.
USPC .......................................... 709/229; 709/226

(58) Field of Classification Search
USPC ................. 709/229, 218, 223–228, 239, 245; 714/3, 4, 6, 7, 10, 11, 13, 17; 713/1, 713/100; 340/2.1; 370/420
See application file for complete search history.

(56) References Cited

U.S. PATENT DOCUMENTS

| | | | |
|---|---|---|---|
| 5,187,787 A | 2/1993 | Skeen et al. | |
| 5,339,392 A | 8/1994 | Risberg et al. | |
| 5,504,894 A | 4/1996 | Ferguson et al. | |

(Continued)

FOREIGN PATENT DOCUMENTS

| | | |
|---|---|---|
| JP | 4-271454 | 9/1992 |
| JP | 2004-062603 A | 2/2004 |

(Continued)

OTHER PUBLICATIONS

"U.S. Appl. No. 09/811,158, Advisory Action mailed Aug. 31, 2005", 3 pgs.

(Continued)

*Primary Examiner* — Ruolei Zong
(74) *Attorney, Agent, or Firm* — Lewis Roca Rothgerber LLP (57) ABSTRACT

A system for implementing a failover policy includes a cluster infrastructure for managing a plurality of nodes, a high availability infrastructure for providing group and cluster membership services, and a high availability script execution component operative to receive a failover script and at least one failover attribute and operative to produce a failover domain. In addition, a method for determining a target node for a failover comprises executing a failover script that produces a failover domain, the failover domain having an ordered list of nodes, receiving a failover attribute and based on the failover attribute and failover domain, selecting a node upon which to locate a resource.

15 Claims, 3 Drawing Sheets

(56) References Cited

U.S. PATENT DOCUMENTS

| | | | |
|---|---|---|---|
| 5,513,314 | A | 4/1996 | Kandasamy et al. |
| 5,526,492 | A | 6/1996 | Ishida |
| 5,590,285 | A | 12/1996 | Krause et al. |
| 5,778,187 | A | 7/1998 | Monteiro et al. |
| 5,805,785 | A | 9/1998 | Dias et al. |
| 5,852,724 | A | 12/1998 | Glenn, II et al. |
| 5,862,348 | A | 1/1999 | Pedersen |
| 5,864,854 | A | 1/1999 | Boyle |
| 5,867,494 | A | 2/1999 | Krishnaswamy et al. |
| 5,941,999 | A | 8/1999 | Matena et al. |
| 5,987,621 | A * | 11/1999 | Duso et al. ............ 714/4.11 |
| 6,003,030 | A | 12/1999 | Kenner et al. |
| 6,047,323 | A | 4/2000 | Krause |
| 6,073,126 | A * | 6/2000 | Endo et al. ............ 706/45 |
| 6,108,703 | A | 8/2000 | Leighton et al. |
| 6,145,089 | A | 11/2000 | Le et al. |
| 6,157,955 | A | 12/2000 | Narad et al. |
| 6,173,420 | B1 * | 1/2001 | Sunkara et al. ......... 714/38.14 |
| 6,178,529 | B1 * | 1/2001 | Short et al. ............ 714/51 |
| 6,185,695 | B1 | 2/2001 | Murphy et al. |
| 6,189,111 | B1 * | 2/2001 | Alexander et al. ...... 714/6.13 |
| 6,199,110 | B1 | 3/2001 | Rizvi et al. |
| 6,212,521 | B1 | 4/2001 | Minami et al. |
| 6,243,825 | B1 * | 6/2001 | Gamache et al. ......... 714/4.4 |
| 6,263,433 | B1 | 7/2001 | Robinson et al. |
| 6,266,781 | B1 | 7/2001 | Chung et al. |
| 6,279,032 | B1 * | 8/2001 | Short et al. ............ 709/209 |
| 6,292,905 | B1 | 9/2001 | Wallach et al. |
| 6,421,726 | B1 | 7/2002 | Kenner et al. |
| 6,438,704 | B1 | 8/2002 | Harris et al. |
| 6,438,705 | B1 | 8/2002 | Chao et al. |
| 6,442,685 | B1 | 8/2002 | French et al. |
| 6,449,641 | B1 * | 9/2002 | Moiin et al. ............ 709/220 |
| 6,473,396 | B1 | 10/2002 | Kumar |
| 6,487,622 | B1 | 11/2002 | Coskrey, IV et al. |
| 6,496,941 | B1 | 12/2002 | Segal et al. |
| 6,502,125 | B1 | 12/2002 | Kenner et al. |
| 6,532,494 | B1 | 3/2003 | Frank et al. |
| 6,539,494 | B1 | 3/2003 | Abramson et al. |
| 6,553,413 | B1 | 4/2003 | Leighton et al. |
| 6,564,336 | B1 | 5/2003 | Majkowski |
| 6,594,786 | B1 | 7/2003 | Connelly et al. |
| 6,636,982 | B1 | 10/2003 | Rowlands |
| 6,647,430 | B1 | 11/2003 | Minyard et al. |
| 6,665,706 | B2 | 12/2003 | Kenner et al. |
| 6,745,241 | B1 | 6/2004 | French et al. |
| 6,785,678 | B2 | 8/2004 | Price |
| 6,857,082 | B1 | 2/2005 | Josan et al. |
| 6,859,882 | B2 | 2/2005 | Fung |
| 6,892,317 | B1 | 5/2005 | Sampath et al. |
| 6,901,530 | B2 | 5/2005 | Cerami et al. |
| 6,952,766 | B2 | 10/2005 | Dervin et al. |
| 7,310,683 | B2 | 12/2007 | Shobatake |
| 7,627,694 | B2 | 12/2009 | Sreenivasan et al. |
| 7,716,238 | B2 | 5/2010 | Harris |
| 7,831,620 | B2 | 11/2010 | Barsness et al. |
| 7,962,509 | B2 | 6/2011 | Harris |
| 7,979,460 | B2 | 7/2011 | Harris |
| 2001/0008019 | A1 * | 7/2001 | Vert et al. ............ 714/1 |
| 2002/0198996 | A1 | 12/2002 | Sreenivasan |
| 2012/0016905 | A1 | 1/2012 | Harris |

FOREIGN PATENT DOCUMENTS

| | | |
|---|---|---|
| JP | 2008-555276 | 2/2005 |
| WO | WO-9849620 A1 | 11/1998 |
| WO | WO 2007/097915 | 8/2007 |

OTHER PUBLICATIONS

"U.S. Appl. No. 09/811,158, Final Office Action mailed Jul. 15, 2005", 7 pgs.
"U.S. Appl. No. 09/811,158, Final Office Action mailed Oct. 12, 2007", 8 pgs.
"U.S. Appl. No. 09/811,158, Non Final Office Action mailed Mar. 14, 2006", 9 pgs.
"U.S. Appl. No. 09/811,158, Non Final Office Action mailed Jul. 12, 2004", 7 pgs.
"U.S. Appl. No. 09/811,158, Non Final Office Action mailed Nov. 27, 2006", 9 pgs.
"U.S. Appl. No. 09/811,158, Non-Final Office Action mailed May 14, 2008", 13 pgs.
"U.S. Appl. No. 09/811,158, Notice of Allowance mailed Jul. 21, 2009", 5 pgs.
"U.S. Appl. No. 09/811,158, Response filed Jan. 12, 2005 to Non Final Office Action mailed Jul. 12, 2004", 10 pgs.
"U.S. Appl. No. 09/811,158, Response filed Mar. 27, 2007 to Non Final Office Action mailed Nov. 27, 2006", 10 pgs.
"U.S. Appl. No. 09/811,158, Response filed Apr. 14, 2008 to Final Office Action mailed Oct. 12, 2007", 10 pgs.
"U.S. Appl. No. 09/811,158, Response filed Aug. 15, 2005 to Final Office Action mailed Jun. 15, 2005", 4 pgs.
"U.S. Appl. No. 09/811,158, Response filed Oct. 16, 2006 to Non Final Office Action mailed Mar. 14, 2006", 9 pgs.
"U.S. Appl. No. 09/811,158, Response filed Nov. 14, 2008 to Non Final Office Action mailed May 14, 2008", 11 pgs.
"U.S. Appl. No. 09/811,158, Response filed Dec. 15, 2005 to Advisory Action mailed Aug. 31, 2005", 8 pgs.
"U.S. Appl. No. 09/811,357, Non Final Office Action mailed May 3, 2006", 12 pgs.
"U.S. Appl. No. 09/997,404, Appeal Brief filed Mar. 3, 2008", 21 pgs.
"U.S. Appl. No. 09/997,404, Final Office Action mailed May 3, 2007", 14 pgs.
"U.S. Appl. No. 09/997,404, Final Office Action mailed May 3, 2006", 12 pgs.
"U.S. Appl. No. 09/997,404, Non Final Office Action mailed Jan. 4, 2005", 8 pgs.
"U.S. Appl. No. 09/997,404, Non Final Office Action mailed Nov. 1, 2005", 12 pgs.
"U.S. Appl. No. 09/997,404, Non Final Office Action mailed Nov. 1, 2005", 13 pgs.
"U.S. Appl. No. 09/997,404, Non Final Office Action mailed Nov. 28, 2006", 12 pgs.
"U.S. Appl. No. 09/997,404, Preliminary Amendment filed Nov. 29, 2001", 1 pg.
"U.S. Appl. No. 09/997,404, Response filed Mar. 28, 2007 to Non Final Office Action mailed Nov. 28, 2006", 9 pgs.
"U.S. Appl. No. 09/997,404, Response filed Apr. 3, 2006 to Non Final Office Action mailed Nov. 1, 2005", 7 pgs.
"U.S. Appl. No. 09/997,404, Response filed Jul. 5, 2005 to Non Final Office Action mailed Jan. 4, 2005", 7 pgs.
"U.S. Appl. No. 09/997,404, Response filed Sep. 28, 2006 to Final Office Action mailed May 3, 2006", 8 pgs.
"Microsoft Computer Dictionary", Fifth Edition, (2002), p. 458.
Sreenivasan, Decision on Appeal, U.S. Appl. No. 09/997,404, Jul. 26, 2010, 14 pgs.
Sreenivasan, Examiner's Answer, U.S. Appl. No. 09/997,404, Apr. 10, 2008, 15 pgs.
Sreenivasan, Examiner's Answer, U.S. Appl. No. 09/997,404, Apr. 21, 2008, 16 pgs.
Sreenivasan, Response to OA, U.S. Appl. No. 09/811,158, Jul. 23, 2007, 6 pgs.
"How Network Load Balancing Technology Works," Microsoft TechNet, Mar. 28, 2003, 2007 Microsoft Corporation, http://technet2.microsoft.com/windowsserver/en/library/1611cae3-5865-4897-a186-7...
PCT/US2007/003258 International Search Report and Written Opinion mailed Oct. 16, 2007.
Reasons for Refusal, dated Jul. 27, 2011.
U.S. Appl. No. 11/355,327 Final Office Action mailed Aug. 5, 2009.
U.S. Appl. No. 11/355,327 Office Action mailed Jan. 7, 2009.
U.S. Appl. No. 11/355,327 Final Office Action mailed Aug. 20, 2008.
U.S. Appl. No. 11/355,327 Office Action mailed Feb. 13, 2008.
U.S. Appl. No. 11/367,174 Final Office Action mailed Aug. 6, 2009.
U.S. Appl. No. 11/367,174 Office Action mailed Jan. 6, 2009.
U.S. Appl. No. 11/367,174 Final Office Action mailed Sep. 2, 2008.
U.S. Appl. No. 11/367,174 Office Action mailed Feb. 6, 2008.
U.S. Appl. No. 13/180,541 Final Office Action mailed Aug. 2, 2013.
U.S. Appl. No. 13/180,541 Office Action mailed Sep. 27, 2012.

* cited by examiner

FLEXIBLE FAILOVER POLICIES IN HIGH AVAILABILITY COMPUTING SYSTEMS

CROSS-REFERENCE TO RELATED APPLICATIONS

This application is a continuation of and claims the benefit of priority under 35 U.S.C. 120 to U.S. patent application Ser. No. 09/997,404, filed Nov. 29, 2001, which is a continuation of and claims the benefit of priority under 35 U.S.C. 120 to U.S. patent application Ser. No. 09/811,357, filed Mar. 16, 2001, which claims the benefit of priority under 35 U.S.C. 119(e) of U.S. Provisional Application No. 60/189,864, entitled "HIGH AVAILABILITY COMPUTING SYSTEM AND METHOD" and filed Mar. 16, 2000, and is related to cofiled U.S. patent application Ser. No. 09/811,158, filed Mar. 16, 2001, entitled "MAINTAINING MEMBERSHIP IN HIGH AVAILABILITY COMPUTING SYSTEMS," now issued as U.S. Pat. No. 7,627,694 and entitled "MAINTAINING PROCESS GROUP MEMBERSHIP FOR NODE CLUSTERS IN HIGH AVAILABILITY COMPUTING SYSTEMS," each of which are incorporated by reference herein in their entirety.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, 2001 Silicon Graphics Incorporated, All Rights Reserved.

BACKGROUND

Field of the Description

The present invention is related to computer processing, and more particularly to providing flexible failover policies on high availability computer processing systems.

Description of the Related Art

Companies today rely on computers to drive all aspects of their business. Certain business functions can survive intermittent interruptions in service; others cannot.

To date, attempts to ensure high availability to mission critical applications have relied on two approaches. Applications have been made more available either through the use of specialized fault tolerant hardware or through cumbersome changes to the applications or to the environment in which the applications run. These approaches increase the costs to the organization of running the applications. In addition, certain approaches to making applications more available increase the risk of introducing errors in the underlying data.

What is needed is a system and method of increasing the availability of mission critical applications by providing greater failover flexibility in determining the targets for moving resources from a machine that has failed.

SUMMARY OF THE INVENTION

To address the problems stated above, and to solve other problems that will become apparent in reading the specification and claims, a high availability computing system and method are described. The high availability computing system includes a plurality of servers connected by a first and a second network, wherein the servers communicate with each other to detect server failure and transfer applications to other servers on detecting server failure through a process referred to as "failover".

According to another aspect of the present invention, a system for implementing a failover policy includes a cluster infrastructure for managing a plurality of nodes, a high availability infrastructure for providing group and cluster membership services, and a high availability script execution component operative to receive a failover script and at least one failover attribute and operative to produce a failover domain.

According to another aspect of the invention, a method for determining a target node for a failover comprises executing a failover script that produces a failover domain, the failover domain having an ordered list of nodes, receiving a failover attribute and based on the failover attribute and failover domain, selecting a node upon which to locate a resource.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.
Definitions A number of computing terms will be used throughout this specification. In this specification, a cluster node is a single computer system. Usually, a cluster node is an individual computer. The term node is also used for brevity. When one node fails, other nodes are left intact and able to operate.

A pool is the entire set of nodes involved with a group of clusters. The group of clusters are usually close together and should always serve a common purpose. A replicated database is stored on each node in the pool.

A cluster is a collection of one or more nodes coupled to each other by networks or other similar interconnections. A cluster is identified by a simple name; this name must be unique within the pool. A particular node may be a member of only one cluster. All nodes in a cluster are also in the pool: however, all nodes in the pool are not necessarily in the cluster.

A node membership is the list of nodes in a cluster on which High Availability base software can allocate resource groups.

A process membership is the list of process instances in a cluster that form a process group. There can be multiple process groups per node.

A client-server environment is one in which a set of users operate on a set of client systems connected through a network to a set of server systems. Often, applications within a client-server system are divided into two components: a client component and a server component. Each component can run on the same of different nodes. A process running the client component of the application is called a client; a process running the server component is called a server.

Clients send requests to servers and collect responses from them. Not all servers can satisfy all requests. For instance, a class of Oracle database servers might be able to satisfy requests regarding the employees of a company, while another class might be able to satisfy requests regarding the company's products.

Servers that are able to satisfy the same type of requests are said to be providing the same service. The time interval between the event of posting a request and the event of receiving a response is called latency.

Service availability can be defined by the following example. Consider a web service implemented by a set of web servers running on a single system. Assume that the system suffers an operating system failure. After the system is rebooted, the web servers are restarted and clients can connect again. A failure of the servers therefore appears to clients like a long latency.

A service is said to be unavailable to a client when latencies become greater than a certain threshold, called critical latency. Otherwise, it is available. A service is down when it is unavailable to all clients; otherwise, it is up. An outage occurs when a service goes down. The outage lasts until the service comes up again.

If downtime is the sum of the durations of outages over a certain time interval D=[t, t'], for a certain service S, service availability can be defined as:

$$\text{avail}(S) = 1 - \text{downtime}/(t'-t)$$

where t'−t is a large time interval, generally a year. For instance, a service which is available 99.99% should have an yearly downtime of about an hour. A service that is available 99.99% or higher is generally called highly available.

Service outages occur for two reasons: maintenance (e.g. hardware and software upgrades) and failures (e.g. hardware failures, OS crashes).

Outages due to maintenance are generally considered less severe. They can be scheduled when clients are less active, for instance, during a weekend. Users can get early notification. Downtime due to maintenance is often called scheduled downtime. On the other hand, failures tend to occur when the servers are working under heavy load, i.e. when most clients are connected. Downtime due to failures is often called unscheduled downtime. Some time service availability is measured considering only unscheduled downtime.

Vendors often provide figures for system availability. System availability is computed similarly to service availability. The downtime is obtained by multiplying the average number of system failures (e.g. OS crashes, HW failures) by the average repair time.

Consider a service whose servers are distributed on a set of N (where N>1) nodes in a cluster. For the service to be unavailable, all of the N nodes must fail at the same time. Since most of system failures are statistically independent, the probability of such an event is $p^N$, where p is the probability of a failure of a single system. For example, given a cluster of 2 nodes with availability of 99.7% for each node, at any given time, there is a 0.3% or 0.003 probability that a node is unavailable. The probability of both nodes being unavailable at the same time is 0.003 2=0.000009 or 0.0009%. The cluster as a whole therefore has a system availability of 99.9991% or (1-0.000009). System availability of a cluster is high enough to allow the deployment of highly available services.

A resource is a single physical or logical entity that provides a service to clients or other resources. For example, a resource can be a single disk volume, a particular network address, or an application such as a web server. A resource is generally available for use over time on two or more nodes in a cluster, although it can be allocated to only one node at any given time.

Resources are identified by a resource name and a resource type. One resource can be dependent on one or more other resources: If so, it will not be able to start (that is, be made available for use) unless the dependent resources are also started. Dependent resources must be part of the same resource group and are identified in a resource dependency list.

A resource name identifies a specific instance of a resource type. A resource name must be unique for a given resource type.

A resource type is a particular class of resource. All of the resources in a particular resource type can be handled in the same way for the purposes of failover. Every resource is an instance of exactly one resource type.

A resource type is identified by a simple name. This name must be unique within the cluster. A resource type can be defined for a specific node, or it can be defined for an entire cluster. A resource type that is defined for a specific node overrides a cluster-wide resource type definition with the same name. This allows an-individual node to override global settings from a cluster-wide resource type definition.

Like resources, a resource type can be dependent on one or more other resource types. If such a dependency exists, at least one instance of each of the dependent resource types must be defined. For example, a resource type named Netscape_web might have resource type dependencies on resource types named IP_address and volume. If a resource named web is defined with the Netscape_web resource type, then the resource group containing web must also contain at least one resource of the type IP_address and one resource of the type volume.

In one embodiment, predefined resource types are provided. However, a user can create additional resource types.

A resource group is a collection of interdependent resources. A resource group is identified by a simple name. This name must be unique within a cluster. Table 1 shows an example of the resources for a resource group named Web-Group.

TABLE 1

| Resource | Resource Type |
|---|---|
| Vol1 | volume |
| /fs1 | filesystem |
| 199.10.48.22 | IP_address |
| web1 | Netscape_web |
| Oracle_DB | Application |

In some embodiments, if any individual resource in a resource group becomes unavailable for its intended use, then the entire resource group is considered unavailable. In these embodiments, a resource group is the unit of failover for the High Availability base software.

In some embodiments of the invention, resource groups cannot overlap. That is, two resource groups cannot contain the same resource.

A resource dependency list is a list of resources upon which a resource depends. Each resource instance must have resource dependencies that satisfy its resource type dependencies before it can be added to a resource group.

A resource type dependency list is a list of resource types upon which a resource type depends. For example, the filesystem resource type depends upon the volume resource type, and the Netscape_web resource type depends upon the filesystem and IP_address resource types.

For example, suppose a file system instance /fs1 is mounted on volume /vol1. Before /fs1 can be added to a resource group, /fs1 must be defined to depend on /vol1. The High Availability base software only knows that a file system instance must have one volume instance in its dependency list. This requirement is inferred from the resource type dependency list A failover is the process of allocating a resource group (or application) to another node according to a failover policy. A failover may be triggered by the failure of a resource, a change in the node membership (such as when a node fails or starts), or a manual request by the administrator.

A failover policy is the method used by High Availability base software to determine the destination node of a failover. A failover policy consists of the following:
 Failover domain
 Failover attributes
 Failover script The administrator can configure a failover policy for each resource group. A failover policy name must be unique within the pool.

A failover domain is the ordered list of nodes on which a given resource group can be allocated. The nodes listed in the failover domain must be within the same cluster. However, the failover domain does not have to include every node in the cluster.

The administrator defines the initial failover domain when creating a failover policy. This list is transformed into a run-time failover domain by the failover script. High Availability base software uses the run-time failover domain along with failover attributes and the node membership to determine the node on which a resource group should reside. High Availability base software stores the run-time failover domain and uses it as input to the next failover script invocation. Depending on the run-time conditions and contents of the failover script, the initial and run-time failover domains may be identical.

In general, High Availability base software allocates a given resource group to the first node listed in the run-time failover domain that is also in the node membership. The point at which this allocation takes place is affected by the failover attributes.

A failover attribute is a string that affects the allocation of a resource group in a cluster. The administrator must specify system attributes (such as Auto_Failback or Controlled_Failback). and can optionally supply site-specific attributes.

A failover script is a shell script that generates a run-time failover domain and returns it to the High Availability base software process. The High Availability base software process applies the failover attributes and then selects the first node in the returned failover domain that is also in the current node membership.

The action scripts are the set of scripts that determine how a resource is started, monitored, and stopped. Typically, there will be a set of action scripts specified for each resource type.

The following is the complete set of action scripts that can be specified for each resource:
 probe, which verifies that the resource is configured on a server
 exclusive, which verifies that the resource is not already running
 start, which starts the resource
 stop, which stops the resource
 monitor, which monitors the resource
 restart, which restarts the resource on the same server after a monitoring failure occurs Highly Available Services Overview Highly Available (HA) services can be provided in two ways. First, a multi-server application using built-in or highly available services, can directly provide HA services. In the alternative, a single-server application layered on top of multi-server highly available system services can provide equivalent HA services. In other words, a single-server application may depend on a special application which uses the multi-server application discussed above.

Figure 1A:
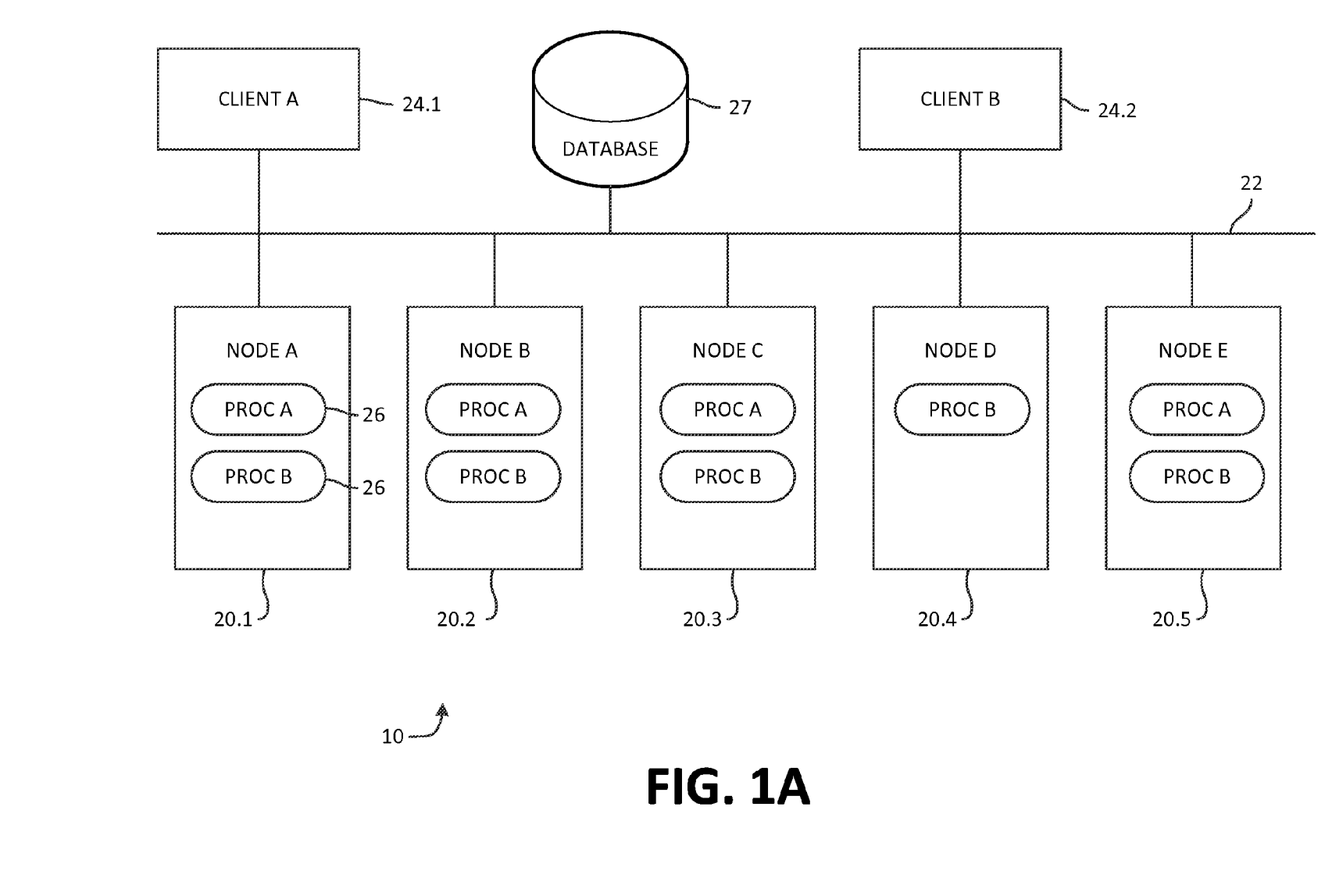
FIG. 1A shows a diagram of the hardware and operating environment in conjunction with which embodiments of the invention may be practiced.

FIG. 1A illustrates an exemplary environment for providing HA services. As shown, the environment 10 includes nodes 20, clients 24, and database 26, all communicably coupled by a network 22. Each of nodes 20.1-20.5 are computer systems comprising hardware and software and can provide services to clients 24. Thus nodes 20 can also be referred to as servers. Specifically, processes 26 comprise software that provides services to client 24. Moreover, each of nodes 20.1 can be suitably configured to provide high availability services according to the various embodiments of the invention.

Figure 1B:
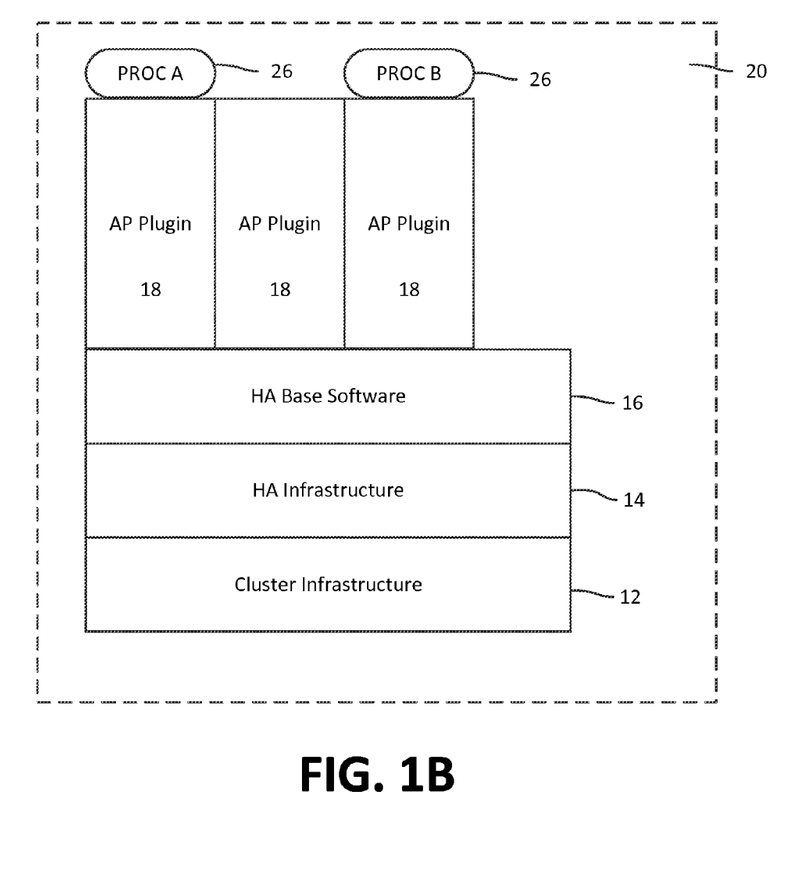
FIG. 1B is a diagram illustrating an exemplary node configuration according to embodiments of the invention.

FIG. 1B provides further detail of software layers according to an embodiment of the invention that can be run on nodes 20 to support HA services. As illustrated, software running on a node 20 includes cluster infrastructure 12, HA infrastructure 14, HA base software 16, application plug-ins 28, and processes 26.

Cluster infrastructure 12 includes software components for performing the following:
 Node logging
 Cluster administration
 Node definition In one embodiment, the cluster software infrastructure includes clusteruster_admin and cluster_control subsystems.

HA infrastructure 14 provides software components to define clusters, resources, and resource types. In one embodiment, the HA infrastructure includes the following:

Cluster membership daemon. Provides the list of nodes, called node membership, available to the cluster.

Group membership daemon. Provides group membership and reliable communication services in the presence of failures to HA base software 12 processes.

Start daemon. Starts HA base software daemons and restarts them on failures.

System resource manager daemon. Manages resources, resource groups, and resource types. Executes action scripts for resources.

Interface agent daemon. Monitors the local node's network interfaces.

Further details on the cluster infrastructure 12 and HA infrastructure 14 can be found in the cofiled, copending, U.S. patent application Ser. No. 09/811,158 entitled "MAINTAINING MEMBERSHIP IN HIGH AVAILABILITY COMPUTING SYSTEMS", previously incorporated by reference.

HA base software 16 provides end-to-end monitoring of services and clients in order to determine whether resource load balancing or failover are required. In one embodiment, HA base software 16 is the IRIS FailSafe product available from Silicon Graphics, Inc. In this embodiment, HAbase software includes the software required to make the following high-availability services:

IP addresses (the IP_address resource type)
XLV logical volumes (the volume resource type)
XFS file systems (the filesystem resource type)
MAC addresses (the MAC_address resource type)

In one embodiment of the invention, application plug-ins 28 comprise software components that provide an interface to convert applications such as processes 26 into high-availability services. For example, application plug-ins 26 can include database agents. Each database agent monitors all instances of one type of database. In one embodiment, database agents comprise the following:

IRIS FailSafe Oracle
IRIS FailSafe INFORMIX
IRIS FailSafe Netscape Web
IRIS FailSafe Mediabase Processes 26 include software applications that can be configured to provide services. It is not a requirement that any of processes 26 be intrinsically HA services. Application plug-ins 18, along with HA base software 16 can be used to turn processes 26 into HA services. In order for a plug-in to be used to turn a process 26 into an HA application, it is desirable that the process 26 have the following characteristics:

The application can be easily restarted and monitored.

It should be able to recover from failures as do most client/server software. The failure could be a hardware failure, an operating system failure, or an application failure. If a node crashed and reboots, client/server software should be able to attach again automatically.

The application must have a start and stop procedure.

When the resource group fails over, the resources that constitute the resource group are stopped on one node and started on another node, according to the failover script and action scripts.

The application can be moved from one node to another after failures.

If the resource has failed, it must still be possible to run the resource stop procedure. In addition, the resource must recover from the failed state when the resource start procedure is executed in another node.

The application does not depend on knowing the host name. That is, those resources that can be configured to work with an IP address.

It should be noted that an application process 26 itself is not modified to make it into a high-availability service.

In addition, node 20 can include a database (not shown). The database can be used to store information including:

Resources
Resource types
Resource groups
Failover policies
Nodes
Clusters

In one embodiment, a cluster administration daemon (cad) maintains identical databases on each node in the cluster.

Method

Figure 2:
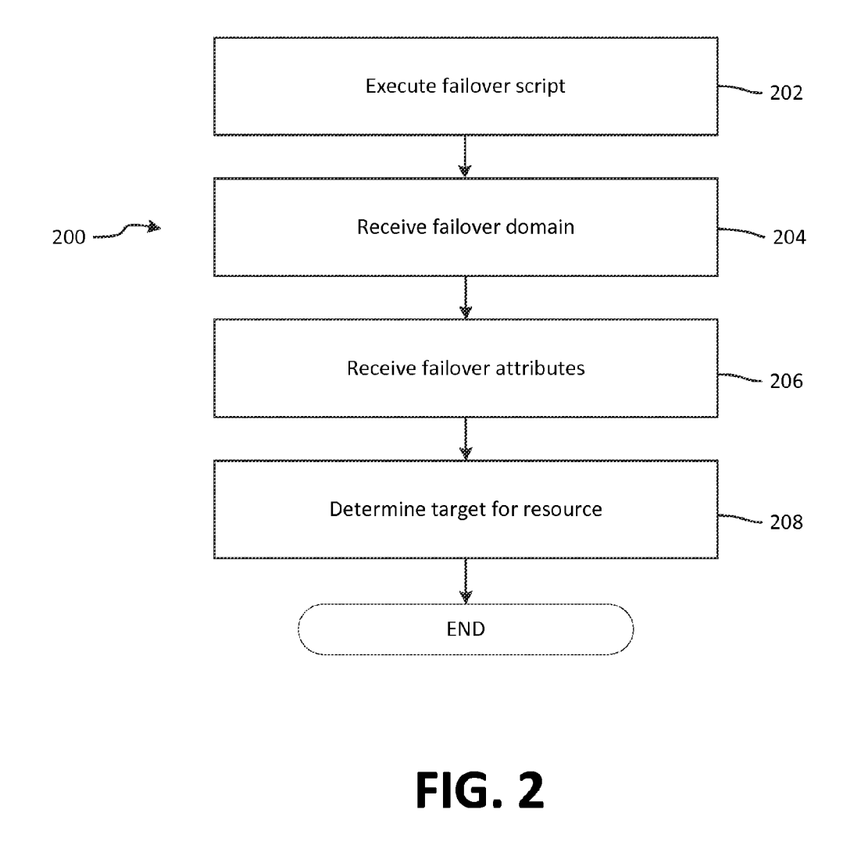
FIG. 2 is a flowchart illustrating a method for providing failover policies according to an embodiment of the invention.

The previous section described an overview of a system for providing high availability services and failover policies for such services. This section will provide a description of a method 200 for providing failover policies for high availability services. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 2 is inclusive of the acts required to be taken by an operating environment executing an exemplary embodiment of the invention.

The method 200 begins when a software component, such as HA base software 16 (FIG. 1A) executes a failover script for a resource in response to either a failover event such as a node or process failure, or a load balancing event such as a resource bottleneck or processor load (block 202). The failover script can be programmed in any of a number of languages, include Java, perl, shell (Bourne, C-Shell, Korn shell etc.) or the C programming language. The invention is not limited to a particular programming language. In one embodiment of the invention, the following scripts can be executed:

probe, which verifies that the resource is configured on a node
exclusive, which verifies that the resource is not already running
start, which starts the resource
stop, which stops the resource
monitor, which monitors the resource
restart, which restarts the resource on the same node when a monitoring failure occurs It should be noted that in some embodiments, the start, stop, and exclusive scripts are required for every resource type. A monitor script may also required, but if need be only a return-success function. A restart script may be required if the restart mode is set to 1; however, this script may contain only a return-success function. The probe script is optional.

In some embodiments, there are two types of monitoring that may be accomplished in a monitor script:

Is the resource present?
Is the resource responding?

For a client-node resource that follows a protocol, the monitoring script can make a simple request and verify that the proper response is received. For a web node, the monitoring script can request a home page, verify that the connection was made, and ignore the resulting home page. For a database, a simple request such as querying a table can be made.

Next, a system executing the method receives a failover domain as output from the failover script (block 204). The failover script can receive an input domain, apply script logic, and provide an output domain. The output domain is an ordered list of nodes on which a given resource can be allocated.

Next, the system receives failover attributes (block 206). The failover attributes are used by the scripts and by the HA base software to modifying the run-time failover domain used for a specific resource group. Based on the failover domain and attributes, the method determines a target node for the resource (block 208). Once a target node has been determined, the system can cause the resource to start on the target node.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A system for implementing a failover policy in a network, the system comprising:
a processor; and
memory storing:
the failover policy, wherein the failover policy includes a failover script, at least one failover attribute, and a predetermined initial failover domain; and
instructions that when executed by the processor:
manage a plurality of nodes arranged as one or more clusters;
provide a plurality of group and cluster membership services;
define a plurality of resource groups, wherein each resource group includes two or more interdependent resources; and
execute the failover script in response to detecting a failover event, wherein the execution of the failover script:
dynamically transforms the predetermined initial failover domain into a dynamic run-time failover domain upon occurrence of a failover event, wherein the initial failover domain and the dynamic run-time failover domain are respective ordered lists of nodes in the network selected from a plurality of nodes on which a given resource group can be allocated, and wherein the dynamic transformation of the initial failover domain into the dynamic run-time failover domain is based on the contents of the failover script and a plurality of run-time conditions existing at the time of the failover event, modifies the dynamic run-time failover domain for a respective one of the plurality of resource groups based on the at least one failover attribute,
selects a target node from the modified run-time failover domain based on the at least one failover attribute, and
allocates the given resource to the target node.

2. The system of claim 1, wherein the one or more resources includes an application and an application plug-in that provides a high-availability interface for the application.

3. A method for determining a target node for a failover, comprising:
detecting a failover event;
executing a failover script stored in memory of a computing device, the failover script dynamically transforming an initial failover domain into a dynamic run-time failover domain, wherein the dynamic transformation of the initial failover domain into the dynamic run-time failover domain is based on the contents of the failover script and a plurality of run-time conditions existing at the time of the failover event, the initial and run-time failover domains each having a respective ordered list of nodes selected from a plurality of nodes on which a given resource group can be allocated;
receiving a failover attribute associated with the failover event;
modifying the run-time failover domain for the given resource group based on the failover attribute; and
selecting from the modified run-time failover domain a node upon which to locate the given resource group.

4. The method of claim 3, wherein selecting the node includes selecting a first node in the respective ordered list of nodes of the run-time failover domain.

5. A system for implementing a failover policy in a network, the system comprising:
a server having a processor and memory, the memory storing:
the failover policy, wherein the failover policy includes a failover script, at least one failover attribute, and a predetermined initial failover domain, wherein the failover script includes a set of one or more commands; and
instructions that when executed by the processor:
manage a plurality of nodes;
provide group and cluster membership services; and
execute the failover script in response to detecting a failover event, wherein execution of the failover script:
produces a dynamic run-time failover domain from the predetermined initial failover domain, wherein the dynamic run-time failover domain and the predetermined initial failover domain are respective ordered lists of nodes in the network selected from the plurality of nodes on which a given resource group having one or more resources can be allocated,
modifies the run-time failover domain for the given resource group based on the received failover attribute, and
executes one or more action scripts that when executed cause the given resource group to failover to a target node selected from the respective ordered list of nodes in the dynamic run-time failover domain.

6. The system of claim 5, wherein the failover event includes failure of a node.

7. The system of claim 5, wherein the failover event includes a load-balancing event independent of node failure.

8. The system of claim 5, wherein the one or more resources includes an application and an application plug-in that provides a high-availability interface for the application.

9. A method for configuring nodes in a cluster, comprising:
defining a plurality of resource groups, wherein each resource group is a respective collection of interdependent resources;
defining, for each resource group, a respective failover policy for the group, wherein the respective failover policy includes a respective initial failover domain, one or more respective failover attributes and a respective failover script, and wherein the respective initial failover domain is a respective ordered list of nodes in the cluster on which the resource group can be allocated;
detecting a failover event;
executing the respective failover script for a particular resource group upon detecting the failover event, the respective failover script including a set of one or more commands that, when executed, dynamically determine a respective run-time failover domain from the respective initial failover domain associated with the particular resource group;
receiving a failover attribute;
modifying the respective run-time failover domain determined for the particular resource group based on the received failover attribute;
selecting a target node upon which to allocate the particular resource group from the respective run-time failover domain determined and modified for the particular resource group, the selection based on the received failure attribute; and
executing one or more action scripts that when executed cause the particular resource group to failover to the selected target node.

10. The method of claim 9, wherein selecting the target node includes selecting a first node in the respective ordered list of nodes of the respective run-time failover domain determined for the particular resource group.

11. The method of claim 9, wherein the action script verifies that the resource is configured on the target node.

12. The method of claim 9, wherein the action script verifies that the resource is not already running on the target node.

13. The method of claim 9, wherein the failover event includes failure of a node.

14. The method of claim 9, wherein the failover event includes a load balancing event independent of node failure.

15. The method of claim 9, further comprising:
storing the respective run-time failover domain in memory;
detecting a second failover event; and
executing the respective failover script for the particular resource group upon detection of the second failover event, wherein the respective run-time failover domain is provided as input to the respective failover script for the particular resource group, and wherein the respective failover script dynamically determines a second run-time failover domain for the particular resource group.

* * * * *